United States Patent [19]

Kubota et al.

[11] 3,833,473

[45] *Sept. 3, 1974

[54] METHOD FOR PRODUCING L-ARGININE BY FERMENTATION

[75] Inventors: Koji Kubota, Kanagawa; Takiko Onoda, Tokyo; Hirotaka Kamijo; Fumihiro Yoshinaga, both of Kanagawa; Shinji Okumura, Tokyo, all of Japan

[73] Assignee: Ajinomoto Co., Inc., Tokyo, Japan

[*] Notice: The portion of the term of this patent subsequent to Mar. 27, 1990, has been disclaimed.

[22] Filed: June 19, 1972

[21] Appl. No.: 264,317

[30] Foreign Application Priority Data
June 21, 1971 Japan.............................. 46-44619

[52] U.S. Cl........................ 195/29, 195/30, 195/47, 195/49

[51] Int. Cl........................................... C12d 13/06
[58] Field of Search........................ 195/47.28 R, 29

[56] References Cited
UNITED STATES PATENTS

| | | | |
|---|---|---|---|
| 3,222,258 | 12/1965 | Iizuka et al. ............. | 195/103.5 R X |
| 3,723,249 | 3/1973 | Kubota et al. .......................... | 195/47 |

*Primary Examiner*—Lionel M. Shapiro
*Assistant Examiner*—R. B. Penlond
*Attorney, Agent, or Firm*—Hans Berman; Kurt Kelman

[57] ABSTRACT

Extracellular L-arginine is produced in commercially useful amounts by cultures of Microbacterium ammoniaphilum FERM-P 976, a mutant capable of growth on a culture medium containing more than 1,000 μg/ml 2-thiazolealanine, a growth inhibitor for the parent strain which does not produce L-arginine.

2 Claims, No Drawings

METHOD FOR PRODUCING L-ARGININE BY FERMENTATION

This invention relates to a method for producing L-arginine (hereinafter referred to as arginine) by fermentation.

Arginine is an important amino acid widely used for medicine and feed, and has been prepared on a commercial scale from protein hydrolyzates at relatively high cost in a complex isolation procedure. It is produced by certain wild strains of hydrocarbonassimilating Corynebacterium and Brevibacterium in a very low concentration (U.S. Patent Nos. 3,222,258 and 3,440,141).

It was now found that certain mutant strains of Microbacterium produce significant amounts of arginine in an aqueous medium.

The mutant strains employed in the process of this invention can be readily derived by known mutation methods from parent strains of Microbacterium which are incapable of producing extracellular arginine. Usually, an effective arginine producing mutant strain is found to be resistant to a growth inhibiting agent for the parent strain, such as 2-thienylserine, D-serine, ethionine, 2-thiazolealanine, α-amino-β-hydroxyvaleric acid, 6-chloropurine and sulfa drugs (sulfaguanidine, sulfamerazine, sulfisomezole, sulfisoxazole, etc.).

A mutant strain capable of growing on a medium containing more than 1,000 μg/ml 2-thiazolealanine is most effective. Sometimes the addition of nutrients required for growth of the resistant strain improves the yield of arginine.

The most effective arginine producing mutant found so far is Microbacterium ammoniaphilum AJ 3353 (FERM-P 976; the FERM-P- number is the deposit accession number of the Fermentation Research Institute, Agency of Industrial Science and Technology, the Ministry of the International Trade and Industry, of No. 1-8-5, Inagehigashi, Chiba-shi, Chiba-ken, Japan).

The culture media used in the present invention are conventional in themselves, and contain assimilable carbon sources, assimilable nitrogen sources, inorganic ions and, if necessary, minor organic nutrients. Assimilable carbon sources are carbohydrates such as glucose, sucrose, starch, starch hydrolyzates or molasses, organic acids such as acetic acid, gluconic acid, succinic acid and citric acid, and alcohols such as ethanol, and for a certain strain n-alkanes. Assimilable nitrogen sources are ammonium salts, nitrates, amino acids, urea and gaseous ammonia.

For a good yield of arginine, the fermentation is carried out aerobically with aeration and agitation. Best yields require pH control within the range of 5 to 9. The desired pH may be maintained by means of gaseous or aqueous ammonia, calcium carbonate, alkali metal hydroxide, urea, organic or inorganic acids.

When the fermentation is carried out at 24°–37°C, the maximum concentration of arginine in the broth is reached within 2 to 7 days.

The arginine accumulated in the fermentation broth can be recovered by conventional methods, such as by using ion exchange resin in combination with precipitation. The arginine was identified by its ninhydrin reaction on a paper chromatogram, the Rf value on the paper chromatogram, a positive Sakaguchi reaction and growth curves of arginine requiring mutants of lactic acid bacteria. The arginine in the broth was determined by bioassay employing Leuconostoc mesentroides ATCC 8042.

EXAMPLE 1

300 Ml batches of a medium containing 10 g/dl glucose, 0.2 g/dl $KH_2PO_4$, 1.5 g/dl $(NH_4)_2SO_4$, 0.04 g/dl $MgSO_4 \cdot 7H_2O$, 50 μg/l biotin, 50 μg/l thiamine·HCl, 1 mg/dl $FeSO_4 \cdot 7H_2O$, 1 mg/dl $MnSO_4 \cdot 4H_2O$ and 1 ml/dl soy protein hydrolyzate, and of pH 7.5 were placed in 1,000 ml fermentation vessels, and sterilized by heat.

Microbacterium ammoniaphilum AJ 3353 (FERM-P 976) previously cultured on bouillon agar slants was inoculated in each medium, and cultured at 31°C with aeration and agitation for 48 hours, maintaining pH at 7.5 with gaseous ammonia. The cultured broth was found to contain 0.41 g/dl arginine. Two liters of the cultured broth was centrifuged to remove cells. The supernatant was passed through a column packed with an ion exchange resin (Amberlite C-50, $NH_4^-$ type), and arginine was eluted with 2N $NH_4OH$. The eluate was concentrated to precipitate crude crystalline arginine. 4.9 G of the crystalline material was obtained.

EXAMPLE 2

300 Ml batches of a medium containing 0.3 g/dl ammonium acetate, 0.4 g/dl potassium acetate, 0.1 g/dl $KH_2PO_4$, 0.04 g/dl $MgSO_4 \cdot 7H_2O$, 1 mg/dl $FeSO_4 \cdot 7H_2O$, 1 mg/dl $MnSO_4 \cdot 4H_2O$, 2 ml/dl soy protein hydrolyzate, 50 μg/l biotin, 50 μg/l thiamine·HCl, 0.5 ml/dl corn steep liquor and 0.3 g/dl urea, and of pH 7.2 were placed in 1,000 ml fermentation vessels, and sterilized by heat.

Microbacterium ammoniaphilum AJ 3353 (FERM-P 976) was cultured on a medium containing 0.5 g/dl glucose, 1 g/dl yeast extract and 1 g/dl peptone, and 15 ml of the cultured broth was transferred to each fermentation vessel. Fermentation was carried out at 31.5°C while agitating at 1,200 r.p.m. and introducing 300 ml/min air into the vessel. During the fermentation, the pH of the medium was maintained at 7.0 to 7.7. by adding 60 percent acetic acid or gaseous ammonia. After 48 hours' cultivation, 36.6 g of acetic acid was consumed and 0.24 g/dl arginine was accumulated in the broth.

EXAMPLE 3

300 Ml batches of a medium containing 1.5 g/dl ethanol, 0.5 g/dl $(NH_4)_2SO_4$, 0.1 g/dl $KH_2SO_4$, 0.04 g/dl $MgSO_4 \cdot 7H_2O$, 1 mg/dl $FeSO_4 \cdot 7H_2O$, 2 ml/dl soy protein hydrolyzate, 100 μg/l biotin, 50 μg/l thiamine·HCl and 0.5 ml/dl corn steep liquor, and of pH 7.2 were placed in 1,000 ml fermentation vessels, and sterilized by heat. 15 Ml of the same inoculum as in Example 2 of Microbacterium ammoniaphilum AJ 3353 (FERM-P 976) was transferred to each fermentation vessel. Fermentation was carried out at 30°C while agitating at 1,500 r.p.m. and introducing 300 ml/min air into the fermentation vessel. During the fermentation, the pH of the medium was maintained at 7.0 to 7.5 by adding gaseous ammonia. The concentration of ethanol was analyzed by gas-chromatography and the concentration of ethanol was maintained at about 0.1 g/dl. After 48 hours' cultivation, 0.22 g/dl arginine was found in the fermentation broth (the yield of arginine based on ethylalcohol fed was 2.0 %).

What is claimed is:

1. A method of producing L-arginine which comprises culturing Microbacterium ammoniaphilum FERM-P 976 in an aqueous culture medium until extracellular arginine accumulates in said medium, and recovering the accumulated L-arginine from said medium.

2. A method as set forth in claim 1, wherein said aqueous medium contains, as a carbon source, glucose sucrose, acetic acid, or ethanol.

* * * * *